United States Patent [19]

Gafken et al.

[11] Patent Number: 5,708,799
[45] Date of Patent: Jan. 13, 1998

[54] PCMCIA AUTOCONFIGURE PC CARD

[75] Inventors: Andrew H. Gafken, Folsom, Calif.; H. John McGrath, Hillsboro, Oreg.

[73] Assignee: Intel Corporation, Santa Clara, Calif.

[21] Appl. No.: 726,797

[22] Filed: Oct. 7, 1996

Related U.S. Application Data

[63] Continuation of Ser. No. 334,742, Nov. 4, 1994, abandoned.
[51] Int. Cl.⁶ ................................................. G06F 13/00
[52] U.S. Cl. ..................... 395/500; 395/280; 395/282; 395/527; 395/828; 395/830; 395/882; 364/238; 364/238.5; 326/37; 326/38
[58] Field of Search ................................. 395/500, 280, 395/281, 282, 283, 284, 828, 882, 527, 830; 364/238, 238.5, DIG. 1; 326/37, 38, 86

[56] References Cited

U.S. PATENT DOCUMENTS

| | | | |
|---|---|---|---|
| 5,055,661 | 10/1991 | Gochi | 235/492 |
| 5,210,875 | 5/1993 | Bealkowski et al. | 395/700 |
| 5,325,490 | 6/1994 | Brasseur | 395/325 |
| 5,436,621 | 7/1995 | Macko et al. | 340/825.44 |
| 5,440,244 | 8/1995 | Richter et al. | 326/37 |

*Primary Examiner*—Kevin J. Teska
*Assistant Examiner*—Thai Phan
*Attorney, Agent, or Firm*—Blakely, Sokoloff, Taylor & Zafman

[57] ABSTRACT

A system for enabling a PC card to appropriately function in the 16-bit and 32-bit standard PCMCIA environments. If the 16-bit standard and the 32-bit standard requires a pin to be connected in a certain manner, then the pin is connected in that manner. If the 16-bit standard requires a card detect pin to be grounded and the 32-bit standard requires that same card detect pin to be connected to a voltage sense pin, then the card detect pin and voltage sense pin are connected, and the card detect pin is connected to ground via a pull-down resistor. After initialization, the standard of the PCMCIA adapter can be detected by sensing the voltage of an open-circuited voltage sense pin.

6 Claims, 8 Drawing Sheets

|   | -CD2/CCD2# | -CD1/CCD1# | -VS2/CVS2 | -VS1/CVS1 | Key | Interface | Voltage |
|---|---|---|---|---|---|---|---|
| 1 | GND | GND | Open | Open | 5 V | 16-Bit | 5 V |
| 2 | GND | GND | Open | GND | 5 V | 16-Bit | 5/3.3V |
| 3 | GND | GND | GND | GND | 5 V | 16-Bit | 5/3.3/X.X V |
| 4 | GND | GND | Open | GND | LV | 16-Bit | 3.3 V |
| 5 | GND | connect to CVS1 | connect to CCD2 | connect to CCD1# | LV | CardBus | 3.3 V |
| 6 | GND | GND | GND | GND | LV | 16-Bit | 3.3/X.X V |
| 7 | connect to CVS2 | GND | connect to CCD2 | GND | LV | CardBus | 3.3/X.X V |
| 8 | connect to CVS1 | GND | GND | connect to CCD2# | LV | CardBus | 3.3/X.X/Y.Y V |
| 9 | GND | GND | GND | Open | LV | 16-Bit | X.X V |
| 10 | connect to CVS2 | GND | connect to CCD2# | Open | LV | CardBus | X.X V |
| 11 | GND | connect to CVS2 | connect to CCD1# | Open | LV | CardBus | X.X/Y.Y V |
| 12 | connect to CVS1 | GND | Open | connect to CCD2# | LV | CardBus | Y.Y V |

FIGURE 4

PCMCIA AUTOCONFIGURE PC CARD

This is a continuation of application Ser. No. 08/334,742, filed Nov. 4, 1994, now abandoned.

FIELD OF THE INVENTION

The present invention pertains to the Personal Computer Memory Card International Association (PCMCIA) interface. Specifically the present invention involves a system enabling a PC card to adaptively identify itself to various standards of PCMCIA adapters and then be able to identify the standard of adapter to which it is connected.

BACKGROUND OF THE INVENTION

There is not a single PCMCIA standard. Rather, there is a series of PCMCIA standards with the newer standards having increased capacity and capability over the older standards. The older, 16-bit PCMCIA Release-1 and Release-2 standards (referred to herein as the "16-bit standard") are derivatives of the industry standard architecture (ISA) computer bus. As such they support only slave devices. A newer, 32-bit PCMCIA standard is a derivative of the Peripheral Component Interconnect (PCI) bus and thus supports both slave devices and bus mastering devices.

The 32-bit mechanical specification is virtually identical to that of the 16-bit standard. Thus, 32-bit and 16-bit PC cards fit into both 32-bit and 16-bit sockets. However, the pin definitions of the 16-bit and 32-bit standards are substantially different. For example, the 16-bit standard uses 16 pins for address information and another 16 pins for data; the 32-bit standard uses 32 pins for address information and the same 32 pins for data, multiplexing the pins between the two functions.

The 32-bit standard is designed to be backwards compatible with the 16-bit standard. Thus, a 32-bit adapter is able to properly control and communicate with cards designed to either the 16-bit standard or the 32-bit standard. Because the two standards are electrically incompatible, the 32-bit adapter mimics a less-capable 16 bit adapter when connected to a 16-bit card. The 32-bit standard defines signal pins and a decoding process to allow a 32-bit socket to determine what type of PC card is present.

The 32-bit standard does not require or suggest how 32 bit cards could be backwards compatible with 16-bit standard adapters. That is, the 32-bit standard does not suggest how a PC card could be designed to operate in a 16-bit standard socket and yet be able to take advantage of the increased capabilities of a 32-bit socket when inserted into one. Furthermore, there are not designated pins nor a defined method to enable a PC card to determine the type of PCMCIA socket to which it is connected.

As 32-bit PCMCIA sockets become available on personal computers, new 32-bit PC cards will also become available. There will be confusion in the marketplace as to which cards can work with which sockets.

Thus, there is a need for PCMCIA cards that can operate to the full capabilities of either standard of PCMCIA socket. When connected to a 32-bit socket, these cards would take advantage of the higher 32-bit data rates and capabilities. When connected to a 16-bit socket, these cards would limit their functionality to that allowed by the 16-bit standard.

These cards must be strictly adherent to both specifications, must not require any special drivers to exist on the computer, and must require no action or o awareness by the system software or hardware. Thus, these cards' recognition and configuration process must rely solely on the capabilities of the cards.

Furthermore, these cards must be able to provide appropriate information to the PCMCIA adapter before the card receives power. After these cards receive power, they must be able to detect the socket and configure themselves appropriately.

SUMMARY OF THE INVENTION

According to the present invention, a PC card can adaptively present itself to both 16-bit and 32-bit PCMCIA adapters. To a 16-bit adapter, the PC card appears to be a 16-bit PC card; to a 32-bit adapter, the PC card appears to be a 32-bit PC card.

This adaptive presentation is a result of how the card detect and voltage sense pins are connected on the PC card. These pins are used by the adapters to detect the type of PC card and its voltage requirements.

If the 16-bit standard and the 32-bit standard both require a card detect pin or a voltage sense pin to be grounded on the PC card, then that pin must appear grounded on the PC card.

If the 16-bit standard requires a card detect pin to be grounded on the PC card and the 32-bit standard requires that same pin to be connected to a voltage sense pin on the PC card, then the card detect pin is connected to the voltage sense pin on the PC card. The card detect pin is also connected to ground via a pull-down resistor.

If the 16-bit standard and the 32-bit standard both require a voltage sense pin to be open circuited, then the voltage sense pin is connected to a cathode of a diode. The anode of the diode is connected to a pull-up resistor. The type of PCMCIA adapter to which a PC card is connected can be determined by sensing the voltage level at the anode of the diode.

As a further aspect of the present invention, if the 16-bit standard requires a voltage sense pin to be open-circuited and the 32-bit standard requires the same voltage sense pin to be connected to one of the card detect pins, then the voltage sense pin is connected to the card detect pin via a switchable circuit element. The switchable circuit element is conductive when its control input is open-circuited or grounded. The control input is connected to the power supply pin of the PC card.

The voltage sense pin is also connected to the cathode of a diode. The anode of the diode is connected to a pull-up resistor. Once power is applied to the PC card, the voltage sense pin is no longer connected to the card detect pin; the type of PCMCIA adapter to which the PC card is connected can then be determined by sensing the voltage level at the anode of the diode.

These and other features and advantages of the present invention will be made more clear when considering the following specification when taken in conjunction with the appended drawings.

BRIEF DESCRIPTION OF THE DRAWINGS

FIG. 4 is a table of pin connections and a key used to decode PC card type.

DETAILED DESCRIPTION OF THE INVENTION

Figure 1:
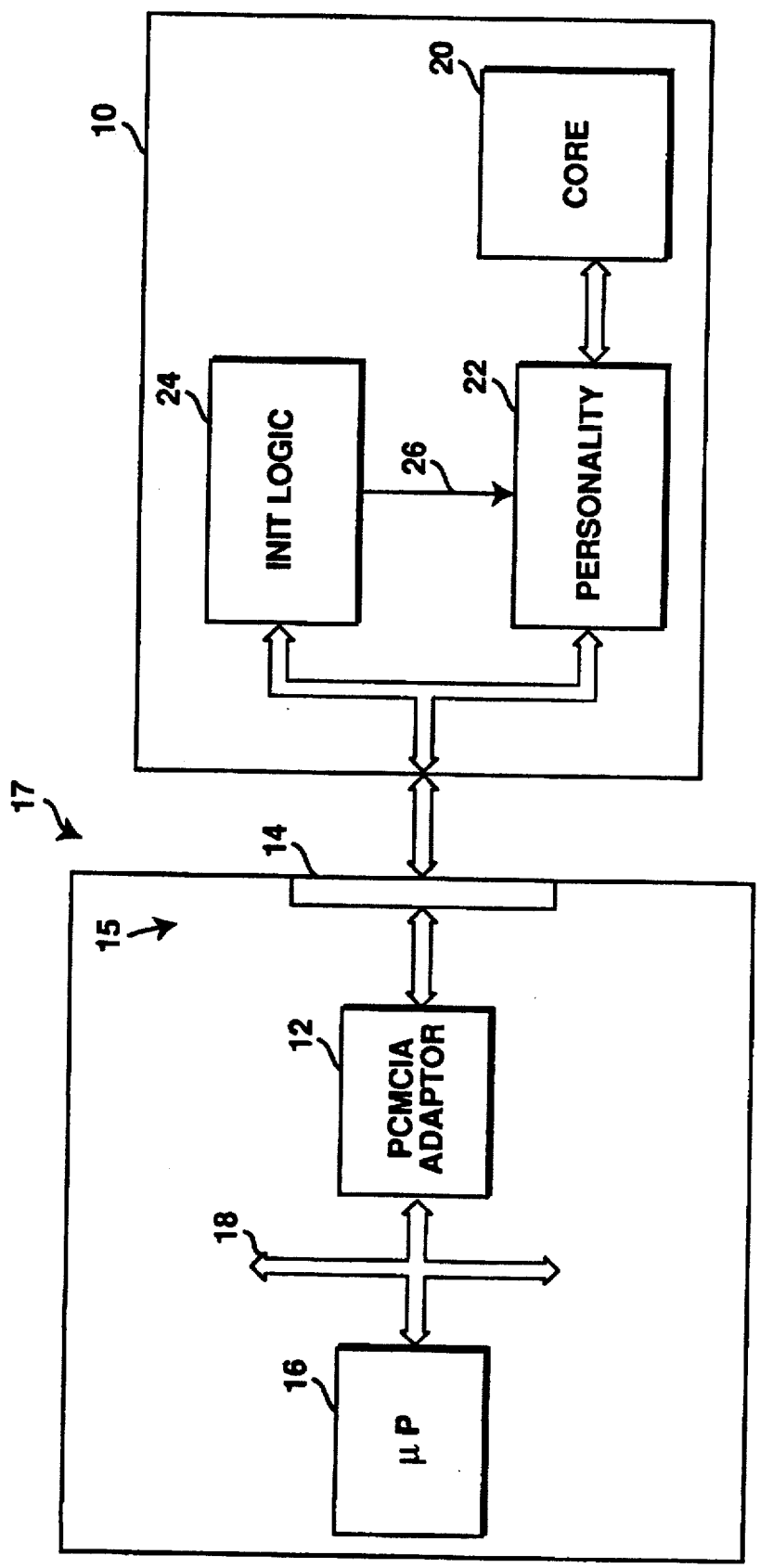
FIG. 1 is a block diagram of a computer system including a PC card that incorporates the present invention.

Referring now to the drawings, and particularly to FIG. 1, a PC card 10 according to the present invention connects to a PCMCIA adapter 12 via a PCMCIA connector 14. The adapter 12 and connector 14 together can be referred to as a "PCMCIA socket" 15. The adapter communicates with the host microprocessor 16 of the host computer 17 via a bus 18. The adapter can be either a 16-bit adapter or a 32-bit adapter.

The functionality of the PC card 10, whether it is RAM, ROM, hard drive, SCSI interface, faxmodem, or some other function, is performed by its core 20. An initialize logic 24 detects the type of adapter 12 to which the PC card 10 is connected and provides a signal on a conductor 26 to a "personality block" 22.

The personality block 22 provides interface support to the core 20 for both 16-bit and 32-bit standards. As such, the personality block 22 routes the various electrical signals from the core 20 to the appropriate pins of the connector 14 for the 16-bit and 32-bit standards. The personality block 22 also accommodates the different interface protocols used by the 16-bit and 32-bit standards. The personality block 22 selects the appropriate routing and protocol to use depending on the signal received from the initialization logic 24 via conductor 26.

The present invention enables the PC card 10 to properly initialize with either type of adapter 12. Initialization occurs whenever the host computer 17 powers up or when a PC card 10 is connected to a PCMCIA socket 15.

Initialization of a PC card 10 in a PCMCIA socket 15 is a two-part process. First, the PCMCIA adapter 12 recognizes the existence of an appropriate PC card 10. That is, the PC card 10 presents itself to the socket 15 as having the greatest capabilities that the socket can properly use. Second, the PC card 10 identifies the type of PCMCIA socket 15 and behaves appropriately.

Figure 2:
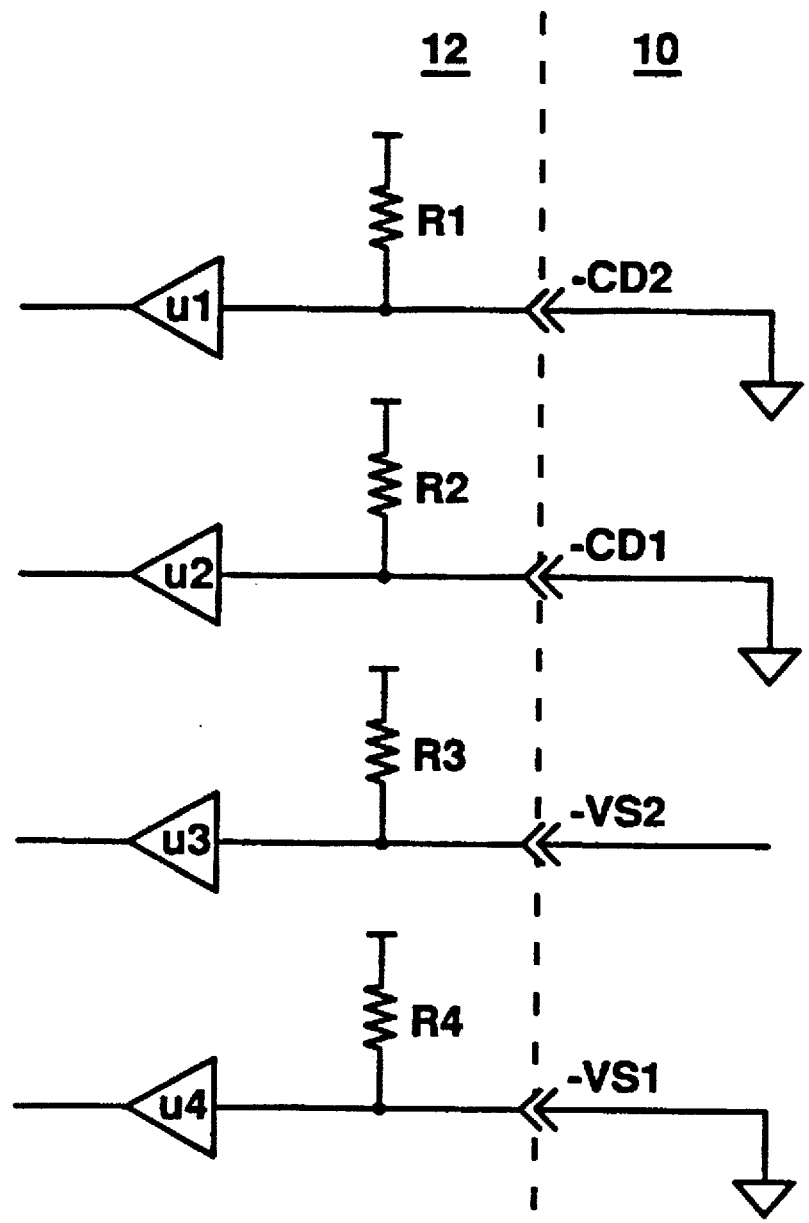
FIG. 2 is a schematic diagram of a 3.3 volt 16-bit PC card connected to a 16-bit PCMCIA socket.

Referring now to FIG. 2, a 16-bit adapter uses two card detect pins named -CD2 and -CD1 (that is, -CD[2:1], where the prefix hyphen "-" signifies that these signals are active low) to detect when a PC card 10 is connected to its connector 14. Resistors R1 and R2 in the socket 15 pull the card detect pins -CD[2:1] high when a card is not inserted. According to the 16-bit and 32-bit standards, the pull-up resistors R1 and R2 must have resistances of at least 10 kilo-ohms.

PC cards 10 that implement the 16-bit PCMCIA interface connect the card detect pins -CD[2:1] to ground internally on the card, thereby causing the corresponding inputs to the two card detect buffers U1, U2 on the socket 15 to be pulled low when the card 10 is inserted into the PCMCIA socket 15. The socket 15 does not recognize the presence of a card 10 until it samples both card detect pins low. Although not shown as such in the schematic diagram, the card detect pins are located at opposite ends of the connector 14 to ensure that both sides of the PC card are firmly seated before the card is detected.

Once a 16-bit adapter 12 detects a PC card 10, it can determine the card's voltage requirements by checking the two voltage sense pins -VS[2:1]. As shown in the table of FIG. 4, depending on a 16-bit card's voltage requirements, it can either ground or leave open-circuited its voltage sense pins. Two pull-up resistors R3, R4 enable the voltage sense buffers U3, U4 to determine the status of the voltage sense pins. The exemplary connections shown in FIG. 2 signify a 3.3 volt 16-bit PC card.

Figure 3:
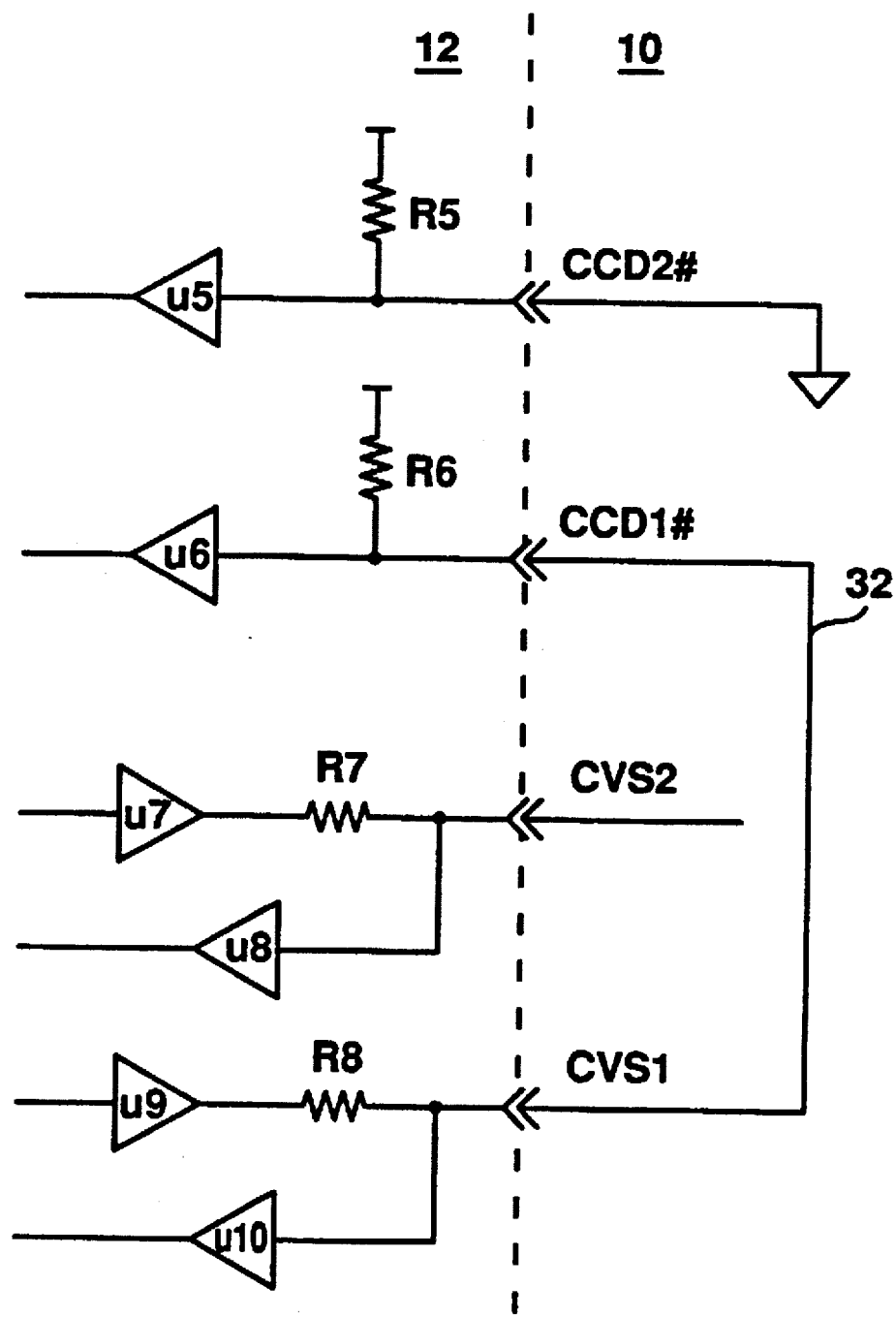
FIG. 3 is a schematic diagram of a 3.3 volt 32-bit PC card connected to a 32-bit PCMCIA socket.

Referring now to FIG. 3, a 32-bit adapter 12 uses the same four pins of the connector 14 that are used by a 16-bit adapter to detect and decode a PC card 10. Similar to the 16-bit standard, a 32-bit adapter detects the presence of a PC card 10 when both of the card detect pins CCD[2:1]# go to ground. (The 32-bit standard renames the pins and uses an octothorp "#" to signify that a signal is active low. As used herein, the 16-bit names are used when referring to a 16-bit adapter, the 32-bit names when referring to a 32-bit adapter, and both names when referring to either or both standards of adapters.) In the absence of a PC card, two pull-up resistors R5, R6 pull the inputs of the card detect buffers U5, U6 high.

As shown in the table of FIG. 4, 32-bit PC cards 10 do not connect both card detect pins CCD[2:1]# to ground. Instead, a 32-bit PC card connects one of the card detect pins to one of the voltage sense pins CVS[2:1]. The adapter 12 uses this connection to determine the PC card's voltage requirements.

To ensure that the card detect pins CCD[2:1]# go low when a PC card 10 is inserted into the socket 15, two PCMCIA adapter drivers U7, U9 force the voltage sense pins low. Thus, whether a PC card connects one of its card detect pins to ground or to a voltage sense pin, the input to the socket's corresponding card detect input buffer U5, U6 will be pulled low when the PC card is inserted into the socket 15.

Note that a 16-bit socket 15 cannot detect a typical 32-bit card 10 that does not have the initialization logic 24 according to the present invention. As discussed above, a 32-bit card connects one of its voltage sense pins CVS[2:1] to one of its card detect pins CCD[2:1]#. However, a 16-bit socket does not drive its voltage sense pins -VS[2:1] low; instead it leaves them open-circuited or pulled up. In either case, the 16-bit socket 15 will not detect the card detect pin connected to a voltage sense pin as grounded.

After a 32-bit adapter 12 detects the presence of a PC card 10, the adapter pulses the two voltage sense pins CVS[2:1] high separately and watches the card detect pins CCD[2:1]# for any change. A change in a card detect pin signifies a connection between that pin and the voltage sense pin being pulsed high. For example, referring to FIG. 3, the PC card 10 connects the first card detect pin CCDi#to the first voltage sense pin CVS1 via conductor 32 while leaving the second voltage sense pin CVS2 open-circuited. When the adapter 12 pulses the first voltage sense pin high, the first card detect buffer U6 detects the first card detect pin going high. When the adapter pulses the second voltage sense pin, neither card detect pin changes state.

Once the 32-bit adapter 12 has identified the PC card 10, it again drives the voltage sense pins CVS[2:1] low. According to the 32-bit standard, an adapter must drive the CVS pins low at all times except when determining the card type and $V_{cc}$ requirements. The adapter then provides power to the PC card.

Referring now to FIG. 4, the 32-bit standard defines twelve different types of PC cards 10. Six of these card types use the 16-bit standard. The remaining six use the 32-bit standard. The cards also vary according to their voltage requirements. The card detect pins -CD[2:1]/CCD[2:1]#, the voltage sense pins -VS[2:1]/CVS[2:1], and a mechanical "key" indicate the type of a PC card. The key prevents a card that must use less than 5 volts from being inserted into a socket 15 that can only provide 5 volts.

One aspect of the present invention is to enable a PC card to appear like a 16-bit card to a 16-bit socket 15 and to appear like a 32-bit card to a 32-bit socket 15. Since no 32-bit card can use a 5-volt power supply, and thus no 32-bit card has the 5-volt key, no PC card can be made to appear like a 16-bit card that has a 5-volt key and also appear like a 32-bit card to a 32-bit socket 15.

Figure 5:
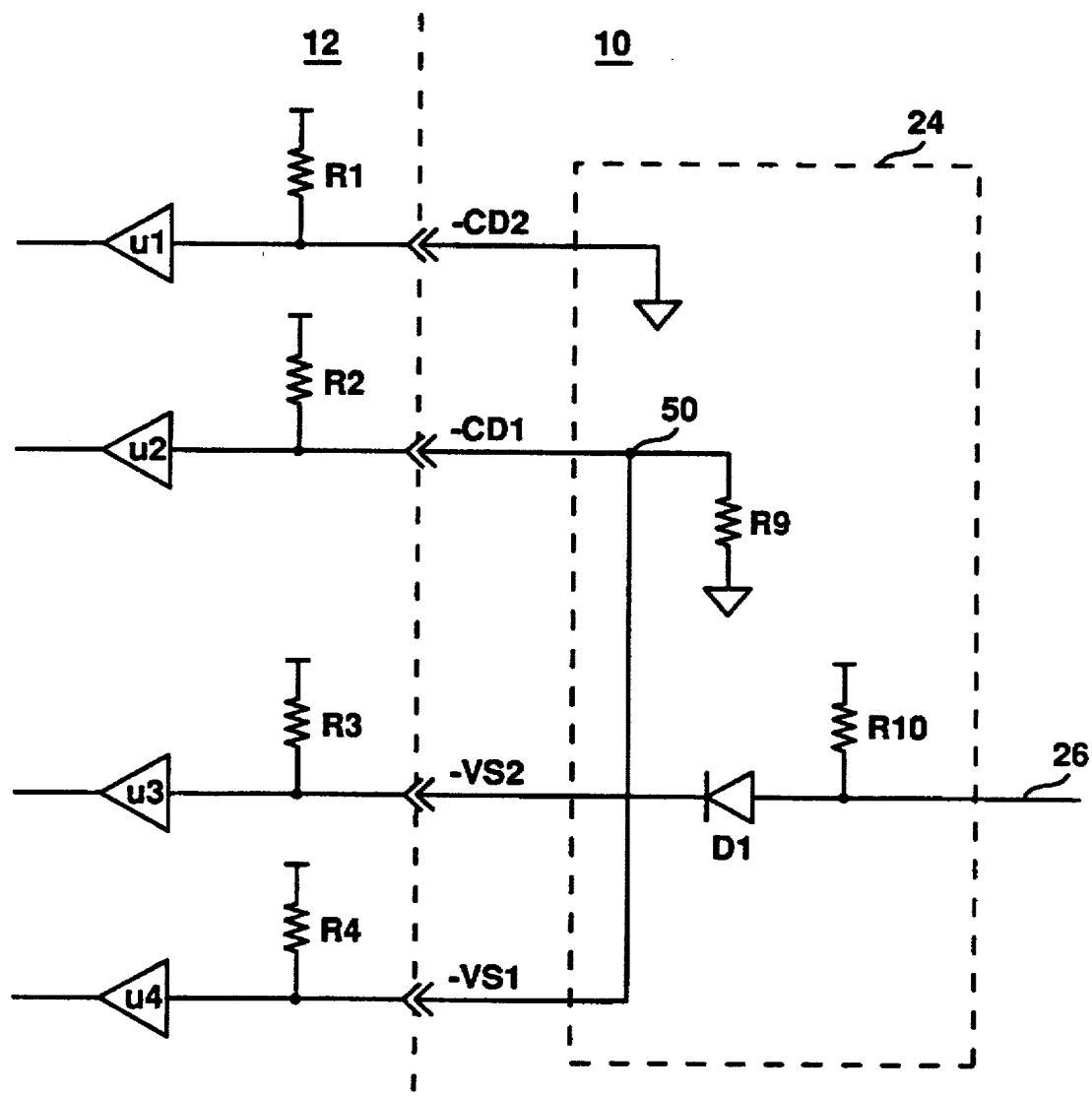
FIG. 5 is a schematic diagram of a 3.3 volt PC card connected to a 16-bit PCMCIA socket, the PC card including the initialization logic shown in FIG. 1 that allows a PC card to appear as a 3.3 volt 16-bit card to a 16-bit adapter and as a 3.3 volt 32-bit card to a 32-bit adapter.
Figure 6:
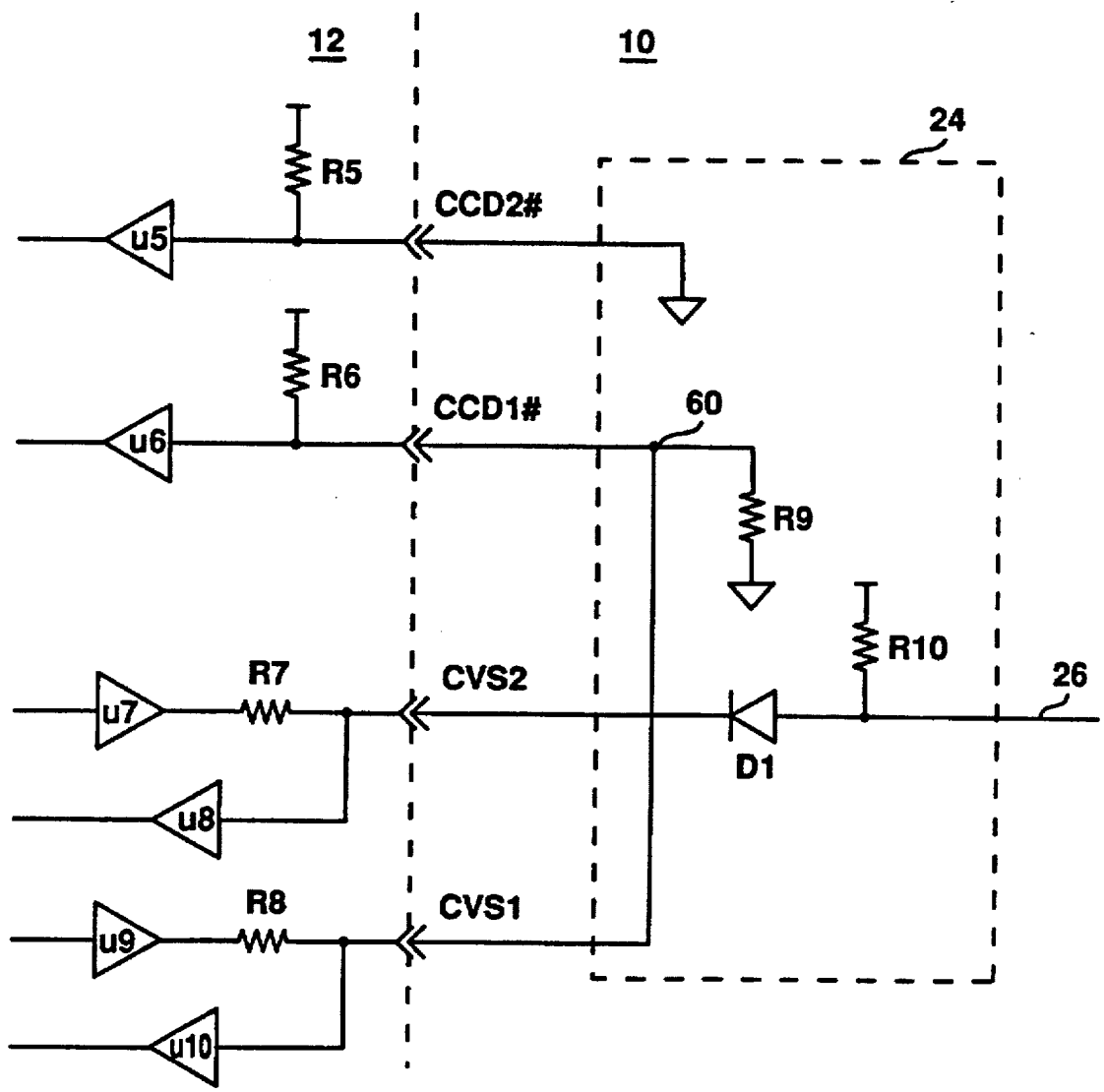
FIG. 6 is a schematic diagram of the 3.3 volt PC card of FIG. 5 connected to a 32-bit socket.

The schematic diagrams of FIGS. 5–6 show the input logic 24 (FIG. 1) connections for the two card detect pins -CD[2:1]/CCD[2:1]# (the notations for both the 16-bit and 32-bit standards are listed separated by a slash) and the two voltage sense pins -VS[2:1]/CVS[2:1]. The PC card 10 connects the second card detect pin -CD2/CCD2# to ground. The first card detect pin -CD1/CCD1# is connected to the first voltage sense pin -VS1/CVS1 with a pull-down resistor R9. The pull-down resistor preferably has a resistance less than 750 ohms. The second voltage sense pin -VS2/CVS2 is connected to the cathode of a diode D1. The anode of the diode is connected to a pull-up resistor R10. The signal at the diode's anode is provided to the personality block 22 of the PC card 10 via conductor 26 as shown in FIG. 1. Preferably, diode D1 has a low forward drop voltage, and may be a Schottky diode.

Referring now to FIG. 5, the second card detect buffer U1 sees the card detect pin -CD2 as grounded. The voltage at node 50 is detected by the buffers U2, U4 connected to the first card detect pin -CD1 and the first voltage sense pin -VS1. This voltage is determined by the voltage divider formed by the two parallel pull-up resistors R2, R4 in series with the pull down resistor R9. If the pull-up resistors have their minimum values as allowed by the standard of 10 kilo-ohms, the voltage at node 50 is four to thirteen percent of the power voltage $V_{cc}$. This voltage is sufficiently low to be detected as a logical low. The second voltage sense buffer U3 sees the second voltage sense pin -VS2 as not grounded, and thus apparently open circuited. Therefore, the card of FIG. 5 appears to a 16-bit socket 15 to be identical to the 3.3-volt, 16-bit PC card of FIG. 2.

Referring now to FIG. 6, the second card detect buffer U5 sees the corresponding card detect pin CCD2# as grounded. The voltage at node 60 is detected by the buffer U6 connected to the first card detect pin CCD1#. Before the 32-bit adapter 12 recognizes the existence of a PC card 10, the voltage sense drivers U7, U9 drive the voltage sense pins CVS[2:1] low. The voltage at node 60 is determined by the voltage divider formed by the pull-up resistor R6 in series with the two effectively parallel resistors R8, R9. Because of the low resistance of terminating resistor R8, being on the order of 50 ohms, the resistance of the pull-down resistor R9 is largely superfluous. The 32-bit adapter 12 thus recognizes both card detect pins as logic lows.

Once the 32-bit adapter 12 recognizes the existence of the PC card 10, it separately pulses the voltage sense pins CVS[2:1] high. The diode D1 enables the second voltage sense pin to appear as open circuited and also protects the personality block 22 from any excess current from the driver U7.

When the socket 15 pulses the first voltage sense pin CVS1 high, the socket 15 watches for voltage changes present at the inputs to the card detect buffers U5, U6. While the output of the first voltage sense driver U9 is high, the voltage at the first card detect buffer U6 is determined by the parallel combination of terminating resistor R8 and pull-up resistor R6 in series with the pull-down resistor R9. The resulting voltage is sufficiently high to be a logical high. Thus, the initialization logic 24 allows the PC card 10 to appear as a 3.3 volt 32-bit card to the 32-bit adapter 12.

Appearing to be an appropriate PC card 10 is only half of the process, the card must also be able to detect which type of socket 15 to which it is connected when the card is powered up. A connection 26 to one of the voltage sense pins -VS[2:1]/CVS[2:1] enable the PC card to make this detection.

The older 16-bit PCMCIA standard has allowed these pins to either remain unconnected or have pull-up resistors R3, R4 as shown in FIG. 5. The 32-bit standard requires the voltage sense pins to be driven low except when the socket 15 is pulsing them to detect the PC card type. This pulsing occurs before the PC card receives power and thus does not interfere with the card's detection of the socket type.

The pull-up resistor R10 connected to the second voltage sense pin -VS2/CVS2 ensures that a 16-bit socket 15 will provide a logic high voltage to the personality block 22 via conductor 26. A 32-bit socket 15 provides a logic low voltage via conductor 26.

To summarize, the exemplary embodiment of the invention shown in FIGS. 5–6 enables a PC card 10 to present itself as either a 16-bit or 32-bit card, depending on the type of socket 15 to which it is connected. When the PC card receives power, it watches one of the voltage sense pins -VS2/CVS2 to determine the type of socket 15.

The present invention can be used to enable PC cards 10 having voltage requirements other than 3.3 volts to work in both 16-bit and 32-bit sockets 15, and take advantage of the increased capabilities of the 32-bit standard. As shown in the sixth row of the table in FIG. 4, a 16-bit socket 15 expects a PC card that operates on either 3.3 volts or X.X volts to ground both of the card detect pins -CD[2:1] and both of the voltage sense pins -VS[2:1]. (The 32-bit standard provides for two supply voltages less than 3.3 volts. The exact value of these voltages are not yet defined. Thus, the 32-bit standard refers to them as X.X and Y.Y volts, where X.X is less than 3.3 and Y.Y is less than X.X.) However, the seventh row shows that a 3.3/X.X volt 32-bit card connects pins CCD2# and CVS2 to each other and grounds pins CCD1# and CVS1.

Figure 7:
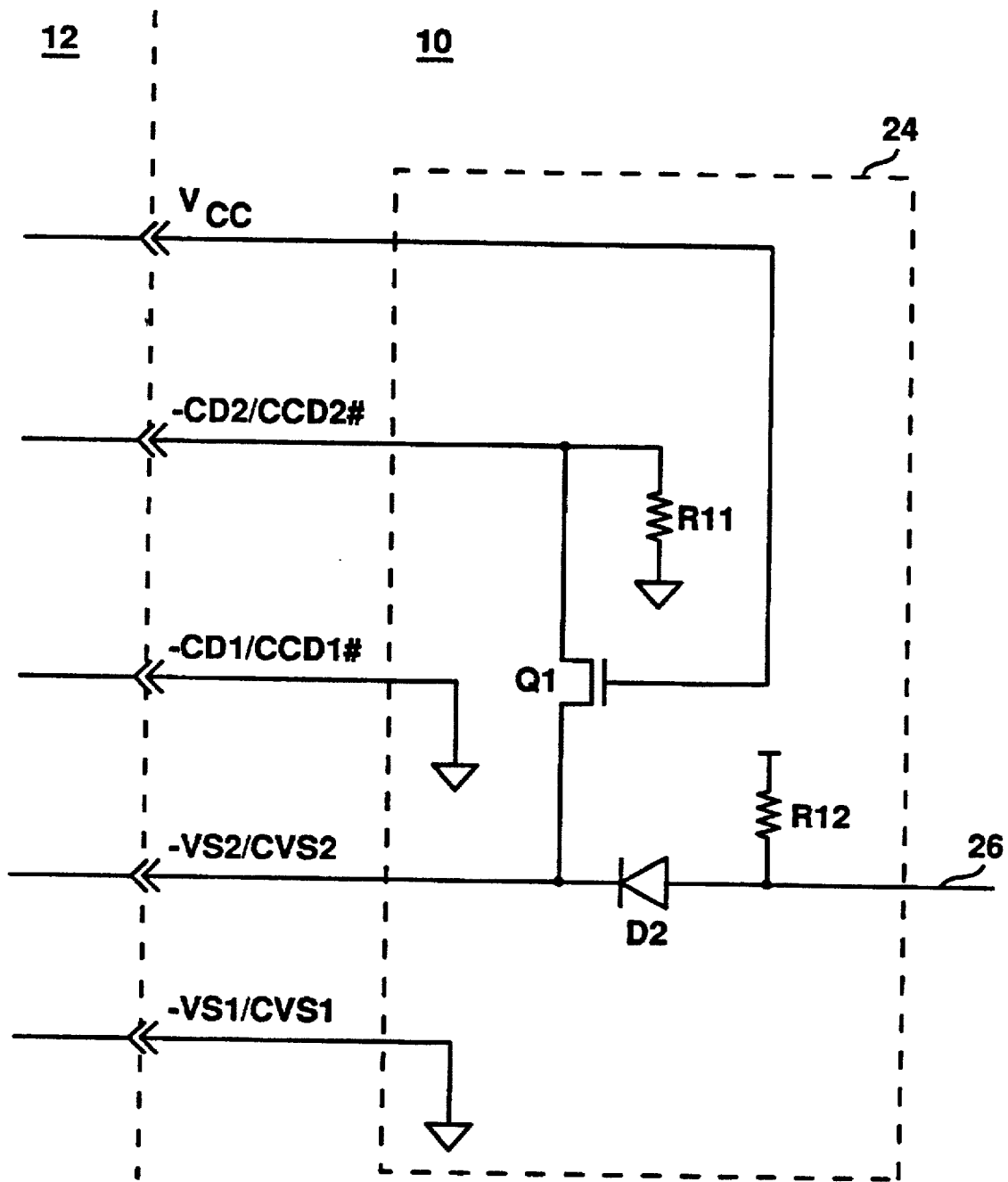
FIG. 7 is a schematic diagram of another initialization logic that allows a PC card to appear as a 3.3/X.X volt 16-bit card to a 16-bit adapter and as a 3.3/X.X volt 32-bit card to a 32-bit adapter.

Refer now to FIG. 7, which shows initialization logic 24 for a PC card that uses either 3.3 or X.X volts. Using the 16-bit names, the initialization logic 24 grounds pins -CD1 and -VS1. Pins -CD2 and -VS2 are interconnected via a transistor switch Q1 whose gate is connected to the card's power pin $V_{cc}$. In the absence of $V_{cc}$, the switch Q1 is conductive. Pin -CD2 is also connected to a pull-down resistor R11. The second voltage sense pin -VS2 is connected to a diode D2 and pull-up resistor R12 as was described for FIGS. 5–6. Preferably, diode D2 has a low forward drop voltage.

When the PC card 10 of FIG. 7 is connected to a 16-bit socket 15, pins -CD1 and -VS1 will appear grounded. Pin -CD2 will also appear grounded because of the pull-down resistor R11. Pin -VS2, being connected to the pull-down resistor R11 via the conductive switch Q1 will also appear grounded. Once detection has finished, the socket 15 may provide power $V_{cc}$ to the card.

Note that the initialization logic 24 may fail partially depending on the implementation of the 16-bit socket 15. If the socket 15 provides power $V_{cc}$ to the card before determining what type of card is connected, the transistor switch Q1 will not be conductive. The second voltage sense pin -VS2 will appear to be open-circuited and thus identical to the circuit described in FIG. 5. Thus, the card will be recognized as a 3.3 volt, 16-bit card and operate accordingly. The socket 15, however, will not detect that the card has the lower X.X volt capability.

The initialization logic 24 may fail more dramatically if the socket 15 continues to monitor the second voltage sense pin -VS2 after providing power $V_{cc}$ to the card 10. In such a case, the socket 15 will detect pin -VS2 going from an apparently grounded state to an apparently open-circuited state. Because of the looseness of the 16-bit standard, it is impossible to predict how a 16-bit socket 15 may respond to such a change.

When the card of FIG. 7 is connected to a 32-bit socket 15, the socket 15 will detect the first card detect pin CCD1# as grounded. The second card detect pin, being connected to the pull-down resistor R11 will also appear grounded to the socket 15. During this detection, according to the 32-bit standard, both voltage sense pins CVS[2:1] will be driven low and the power pin $V_{cc}$ will be grounded internal to the socket 15.

Once the 32-bit socket 15 detects the presence of a PC card, it pulses the voltage sense pins CVS[2:1] high to determine their respective connections. The socket 15 will detect the first voltage sense pin CVS1 as being grounded. Furthermore, because of the transistor switch Q1, the second voltage sense pin CVS2 will appear connected to the second card detect pin CCD2#.

The card 10 must also detect the type of socket 15 to which it is connected. For either type of socket 15, this detection will occur once the power $V_{cc}$ has been applied to the card, thereby making transistor switch Q1 nonconductive. The voltage level of the second voltage sense pin -VS2/CVS2 determines the type of socket 15 in the same manner as discussed with respect to FIGS. 5–6. This voltage is provided to the personality block 22 via conductor 26.

Referring again to the table of FIG. 4, it can be seen that a 3.3/X.X/Y.Y volt 32-bit PC card 10 is encoded nearly the same as a 3.3/X.X volt 32-bit card. A simple modification of the initialization logic 24 shown in FIG. 7 can enable a 3.3/X.X/Y.Y volt 32-bit card to appear as such to a 32-bit socket 15, yet appear as a 3.3/X.X volt 16-bit card to a 16-bit socket 15. As modified, the initialization logic grounds the second voltage sense pin -VS2/CVS2 and connects the first voltage sense pin -VS1/CVS1 to the transistor switch Q1 and the anode of the diode D2. The connections for the card detect pins -CD[2:1]/CCD[2:1]# remain the same.

Figure 8:
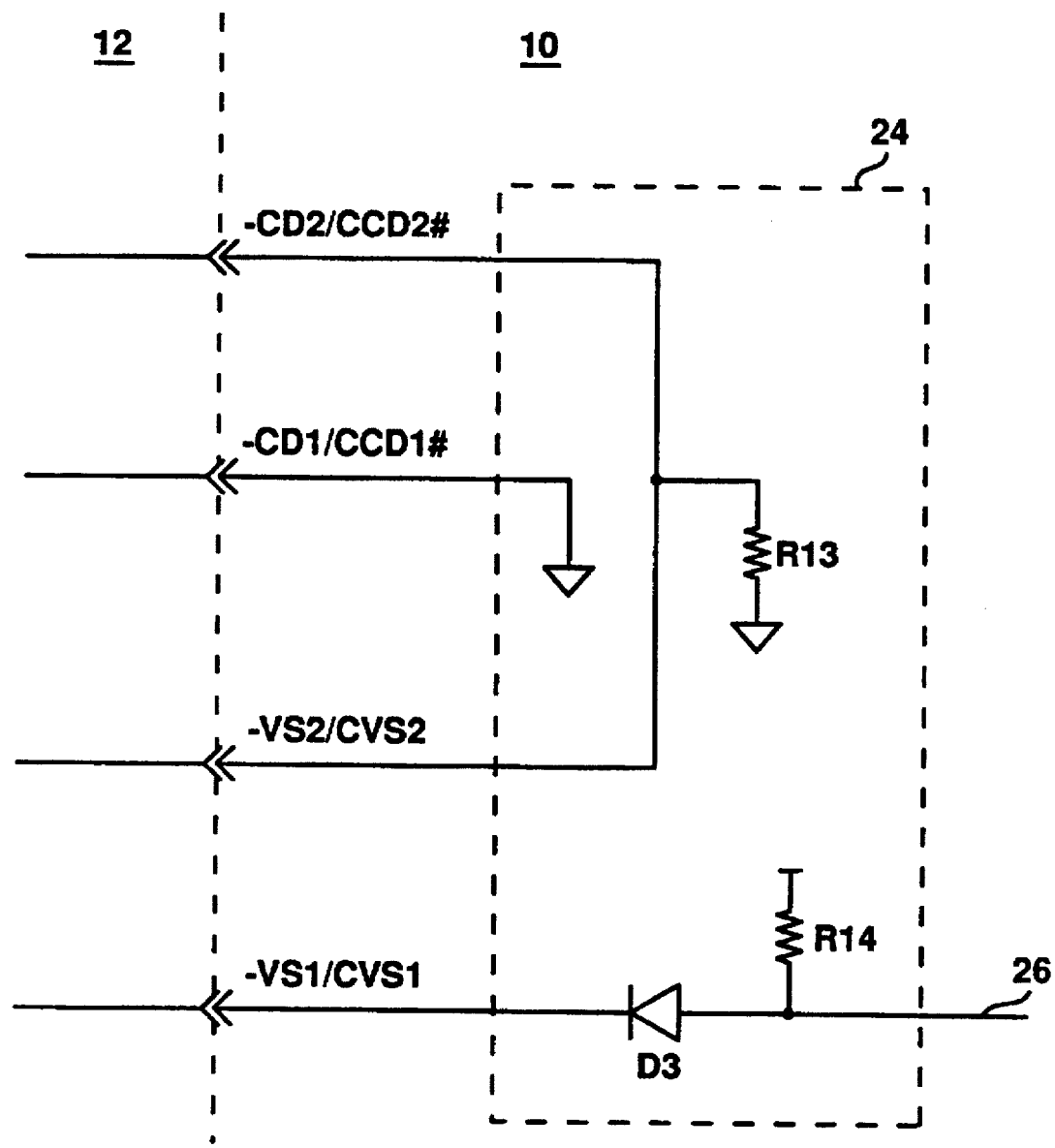
FIG. 8 is a schematic diagram of another initialization logic that allows a PC card to appear as a X.X volt 16-bit card to a 16-bit adapter and as a X.X volt 16-bit card to a 32-bit adapter.

Refer now to FIG. 8, which shows initialization logic 24 for an X.X volt card 10 that appears as a 16-bit card to a 16-bit socket 15 and as a 32-bit card to a 32-bit socket 15. The initialization logic interconnects the second card detect pin -CD2/CCD2# and the second voltage sense pin -VS2/CVS2, and connects both of them to a pull-down resistor R13. The first card detect pin -CD1/CCD1# is grounded while the first voltage sense pin -VS1/CVS1 is connected to a diode D3 and a pull-up resistor R14. The anode of the diode is connected to the personality block 22 via conductor 26.

When connected to a 16-bit socket 15, both card detect pins -CD[2:1] and the second voltage sense pin -VS2 appear as grounded. The first voltage sense pin -VS1 appears to be open-circuited. Referring briefly to FIG. 4, the ninth row of the table shows this to be the proper connections for an X.X 16-bit card 10.

When connected to a 32-bit socket 15, the second voltage sense pin CVS2 is driven low by the corresponding driver. Because of this, and the pull down resistor R13, the second card detect pin CCD2# appear as a logic low. The first card detect pin CCD1# also appears as a logic low.

When pulsing the voltage sense pins CVS[2:1], the 32-bit socket 15 will detect pins CCD2# and CVS2 to be interconnected and pin CVS1 as open-circuited. Referring again to FIG. 4, the tenth row of the table shows this to be the proper connections for an X.X 32-bit card 10.

After the PC card 10 receives power, the initialization logic 24 will provide a voltage via conductor 26 to the personality block that indicates the type of the socket 15. This voltage is determined in the same manner as described above for the initialization logic 24 of FIGS. 5–7. Thus, the PC card is able to determine the type of socket 15 to which it is attached.

Referring again to the table of FIG. 4, it can be seen that a X.X/Y.Y volt 32-bit PC card 10 is encoded nearly the same as a X.X volt 32-bit card. A simple modification of the initialization logic 24 shown in FIG. 8 can enable a X.X/Y.Y volt 32-bit card to appear as such to a 32-bit socket 15, yet appear as a X.X volt 16-bit card to a 16-bit socket 15. As modified, the first card detect pin -CD1/CCD1# and the second voltage sense pin -VS2/CVS2 are interconnected, with both pins connected to the pull-down resistor R13. The second card detect pin -CD2/CCD2# is connected to ground. The first voltage sense pin -VS1/CVS1 would remain connected to the diode D3 and pull-up resistor R14 as shown in FIG. 8.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. A method of adaptively interfacing a PC card with a PCMCIA adapter such that said PC card can act as a 32-bit PC card to said adapter if said adapter supports a 32-bit PCMCIA standard, and as a 16-bit PC card to said adapter if said adapter only supports a 16-bit PCMCIA standard, and such that said PC card can detect which one of said PCMCIA standards is supported by said adapter, the PC card including a first and a second card detect pin, and a first and second voltage sense pin, the method comprising the steps of:

(a) grounding said first card detect pin on said PC card such that said first card detect pin appears to said adapter as being grounded, as expected by said adapter regardless of whether said adapter supports said 32-bit PCMCIA standard or said 16-bit PCMCIA standard; and (b) connecting said second card detect pin to said first voltage sense pin, and further connecting a pull down resistor between said second card detect pin and ground, such that said second card detector pin and said first voltage sense pin appear to said adapter as being connected to each other, as expected by said adapter if said adapter supports said 32-bit PCMCIA standard, and yet both of said second card detector pin and said first voltage sense pin appear to said adapter as being grounded, as expected by said adapter if said adapter supports only said 16-bit PCMCIA standard.

2. The method of claim 1, wherein the method further comprises the steps of:

(c) connecting said second voltage sense pin to a cathode of a diode, and further connecting an anode of said diode to a pull-up resistor, such that the PCMCIA standard supported by said adapter can be discerned, and yet said second voltage sense pin appears to said adapter as being open circuited, as expected by said adapter regardless of whether said adapter supports said 16-bit PCMCIA standard or said 32-bit PCMCIA standard; and (d) sensing a voltage level at said anode of said diode to discern which one of said PCMCIA standards is supported by said PCMCIA adapter.

3. The method of claim 1, wherein step (b) further comprises connecting said first voltage sense pin to said second card detect pin via a switchable circuit element that is open-circuited when a control input of said switchable circuit element is connected to a logical high, and further connecting said control input to a voltage supply pin of said PC card;

step (b) further comprises connecting said first voltage sense pin to a cathode of a diode and connecting an anode of said diode to a pull-up resistor, such that the PCMCIA standard supported by said adapter can be discerned, and yet preserving said connected appearance of said second card detect pin and said first voltage sense pin to said adapter, as expected by said adapter if said adapter is supporting said 32-bit PCMCIA standard, as well as preserving said grounded appearance of said second card detect pin and said first voltage sense pin to said adapter, as expected by said adapter if said adapter is supporting said 16-bit PCMCIA standard;

said method further comprises step (c) grounding said second voltage sense pin on said PC card such that said second voltage sense pin appears to said adapter as being grounded, as expected by said adapter regardless of whether said adapter supports said 32-bit PCMCIA standard or said 16-bit PCMICA standard; and said method further comprises step (c) sensing a voltage level at said anode of said diode to discern which one of said PCMCIA standards is supported by said PCMCIA adapter.

4. A PCMCIA card, said PC card can act as a 32-bit PC card to an adapter if said adapter supports a 32-bit PCMCIA standard, and as a 16-bit PC card to said adapter if said adapter only supports a 16-bit PCMCIA standard, and said PC card can detect which one of said PCMCIA standards is supported by said adapter, comprising:

a first card detect pin;

a second card detect pin connected to ground such that the second card detect pin appears to an interfacing adapter as being grounded, as expected by said adapter regardless of whether said adapter supports a 32-bit PCMCIA standard or a 16-bit PCMCIA standard;

a first voltage sense pin;

a first connection connecting said first card detect pin and said first voltage sense pin, and a pull-down resister connecting said first connection to ground, such that said first card detect pin and said first voltage sense pin appear to said adapter as being connected to each other, as expected by said adapter if said adapter supports said 32-bit PCMCIA standard, and yet said first card detect pin and said first voltage sense pin appear to said adapter as being grounded, as expected by said adapter if said adapter supports said 16-bit PCMCIA standard;

a second voltage sense pin; and a diode having an anode and a cathode, where said cathode is connected to said second voltage sense pin, and a pull-up resistor connected to said anode of said diode such that the supported PCMCIA standard of said adapter can be discerned through a voltage level at said anode of said diode, and yet said second voltage sense pin appears to said adapter as being open circuited, as expected by said adapter regardless of whether said adapter supports said 32-bit PCMCIA standard or said 16-bit PCMCIA standard.

5. A PCMCIA card, said PC card can act as a 32-bit PC card to an adapter if said adapter supports a 32-bit PCMCIA standard, and as a 16-bit PC card to said adapter if said adapter only supports a 16-bit PCMCIA standard, and said PC card can detect which one of said PCMCIA standards is supported by said adapter, comprising:

a first card detect pin connected to ground such that the first card detect pin appears to an interfacing adapter as being grounded, as expected by said adapter regardless whether said adapter supports a 32-bit PCMCIA standard or a 16-bit PCMCIA standard;

a second card detect pin; a first voltage sense pin connected to ground such that the first voltage sense pin appears to an interfacing adapter as being grounded, as expected by said adapter regardless whether said adapter supports a 32-bit PCMCIA standard or a 16-bit PCMCIA standard;

a second voltage sense pin;

a power supply pin;

a switch connected to said power supply pin;

a first connection connecting said second card detect pin to said switch, a second connection connecting said second voltage sense pin to said switch, and a pull-down resister connecting said first connection to ground, such that said second card detect pin and said second voltage sense pin appear to said adapter as being connected, as expected by said adapter if said adapter supports said 32-bit PCMCIA standard, and yet both of said second card detect pin and said second voltage sense pin appear to said adapter as being grounded, as expected by said adapter if said adapter supports said 16-bit PCMCIA standard; and a diode having an anode and a cathode, where said cathode is connected to said second connection, and a pull-up resistor connected to said anode of said diode, such that the supported PCMCIA standard of said adapter can be discerned through a voltage level at said anode of said diode, and yet preserving said connected appearance of said second card detect pin and said second voltage sense pin to said adapter if said adapter supports said 32-bit PCMCIA standard, as well as preserving said grounded appearance of said second card detect pin and aid second voltage sense pin to said adapter if said adapter supports said 16-bit PCMCIA standard.

6. A PCMCIA card, said PC card can act as a 32-bit PC card to an adapter if said adapter supports a 32-bit PCMCIA standard, and as a 16-bit PC card to said adapter if said adapter only supports a 16-bit PCMCIA standard, and said PC card can detect which one of said PCMCIA standards is supported by said adapter, comprising:

- a first card detect pin connected to ground such that the first card detect pin appears to an interfacing adapter as being grounded, as expected by said adapter regardless whether said adapter supports a 32-bit PCMCIA standard or a 16-bit PCMCIA standard;
- a second card detect pin;
- a first voltage sense pin;
- a diode having an anode and a cathode, where said cathode is connected to said first voltage sense pin, and a pull-up resistor connected to said anode of said diode such that the supported PCMCIA standard of said adapter can be discerned through a voltage level at said anode of said diode, and yet said first voltage sense pin appears to said adapter as being open circuited, as expected by said adapter regardless of whether said adapter supports said 32-bit PCMCIA standard or said 16-bit PCMCIA standard;
- a second voltage sense pin; and
- a first connection connecting said second card detect pin to said second voltage sense pin, and a pull-down resister connecting said first connection to ground, such that said second card detect pin and said second voltage sense pin appear to said adapter as being connected to each other, as expected by said adapter if said adapter supports said 32-bit PCMCIA standard, and yet said second card detect pin and said second voltage sense pin appear to said adapter as being grounded, as expected by said adapter if said adapter supports said 16-bit PCMCIA standard.

* * * * *